United States Patent
Vogt et al.

(10) Patent No.: US 9,423,047 B2
(45) Date of Patent: Aug. 23, 2016

(54) DEVICE FOR REGULATING THE FLOW OF A FLUID

(71) Applicant: ASCO NUMATICS GMBH, Oelbronn-Duerrn (DE)

(72) Inventors: Martin Vogt, Oelbronn (DE); Peter Metternich De Oliveira, Maulbronn (DE); Felix Ams, Kaempfelbach (DE)

(73) Assignee: ASCO NUMATICS GMBH, Oelbronn-Duerr (DE)

( * ) Notice: Subject to any disclaimer, the term of this patent is extended or adjusted under 35 U.S.C. 154(b) by 64 days.

(21) Appl. No.: 14/493,518

(22) Filed: Sep. 23, 2014

(65) Prior Publication Data

US 2015/0083949 A1 Mar. 26, 2015

(30) Foreign Application Priority Data

Sep. 26, 2013 (EP) .................................... 13186197

(51) Int. Cl.
*F16K 31/10* (2006.01)
*F16K 11/052* (2006.01)
*F16K 31/06* (2006.01)

(52) U.S. Cl.
CPC .............. *F16K 31/10* (2013.01); *F16K 11/052* (2013.01); *F16K 31/0624* (2013.01)

(58) Field of Classification Search
CPC .... F16K 31/10; F16K 11/052; F16K 31/0624
USPC ....................... 251/129.2, 129.15; 137/625.44
See application file for complete search history.

(56) References Cited

U.S. PATENT DOCUMENTS

| | | | | |
|---|---|---|---|---|
| 2,738,450 A * | 3/1956 | Matthews | ................. | H01F 7/14 251/129.2 |
| 2,895,089 A * | 7/1959 | Leber | .................... | H01H 50/20 137/625.25 |
| 3,683,962 A * | 8/1972 | Good | .................... | F16K 11/168 137/868 |
| 4,085,921 A * | 4/1978 | Ueda | .................... | F16K 31/0658 251/129.08 |
| 4,569,504 A * | 2/1986 | Doyle | ................... | H01F 7/1638 251/129.15 |
| 5,205,323 A * | 4/1993 | Baker | ................... | F16K 31/105 137/625.44 |
| 5,547,165 A * | 8/1996 | Brehm | ................ | F16H 61/0251 251/129.16 |
| 7,740,226 B2 * | 6/2010 | Engel | .................... | F16K 31/105 251/129.2 |
| 7,779,867 B2 * | 8/2010 | Bai | .......................... | F16K 7/14 251/303 |
| 8,104,510 B2 | 1/2012 | Ams et al. | | |
| 8,672,292 B2 | 3/2014 | Leiser et al. | | |
| 2009/0146091 A1 * | 6/2009 | Ams | ..................... | F16K 11/052 251/129.16 |
| 2011/0220824 A1 * | 9/2011 | Ams | .................... | F16K 31/0682 251/129.15 |
| 2011/0315907 A1 | 12/2011 | Ams et al. | | |

FOREIGN PATENT DOCUMENTS

| | | |
|---|---|---|
| DE | 20 2010 010 279 | 12/2010 |
| EP | 1 536 169 | 6/2005 |
| EP | 2 068 056 | 6/2009 |
| EP | 2 400 193 | 12/2011 |

* cited by examiner

*Primary Examiner* — John Bastianelli
(74) *Attorney, Agent, or Firm* — Michael J. Striker

(57) ABSTRACT

A device for regulating the flow of a fluid is provided with a valve housing having at least two valve connections, which are fluidically connected to one another via a valve chamber, at least one valve seat, which has a fluid connection to the valve chamber and one of the valve connections, a valve element, which has an actuating section located outside of the valve chamber and a closing body located within the valve chamber for the at least one valve seat. An electromagnet having a solenoid armature acts upon the actuating section. The solenoid armature is supported via two flat springs.

13 Claims, 4 Drawing Sheets

DEVICE FOR REGULATING THE FLOW OF A FLUID

CROSS-REFERENCE TO A RELATED APPLICATION

The invention described and claimed hereinbelow is also described in European Patent Application 13 186 197.3, filed on Sep. 26, 2013. The European Patent Application, the subject matters of which is incorporated herein by reference, provides the basis for a claim of priority of invention under 35 U.S.C. 119(a)-(d).

BACKGROUND OF THE INVENTION

The present invention relates to a device for regulating the flow of a fluid, comprising a valve housing having at least two valve connections, which are fluidically connected to one another via a valve chamber, at least one valve seat, which has a fluid connection to the valve chamber and one of the valve connections, a valve element, which has an actuating section located outside of the valve chamber and a closing body located within the valve chamber for the at least one valve seat and an electromagnet having a solenoid armature, which acts upon the actuating section.

A device of this type is known from EP 2 068 056 B1. The known device comprises a two-component valve housing. The two-component valve housing is formed of a lower housing part, through which a fluid (i.e., a liquid or gaseous medium), flows and an upper housing part, on which an actuating device for regulating the flow of the medium is disposed.

A valve chamber and three valve connections, which are fluidically connected to one another via the valve chamber, are provided in the lower housing part. Two of the three valve connections are fluidically connected to the valve chamber via a valve seat, wherein the axes of the two valve seats extend parallel to one another. The two valve seats are controlled by a single valve element, wherein one valve seat is opened and the other valve seat is closed, in an alternating manner.

The valve element is a stamped sheet metal part or a similarly produced metal part of a frame clamped between the two housing parts and a cruciform carrier, which is fixedly connected via the shorter cross arms thereof to webs provided on the frame. The webs are swivellably supported in the valve housing. A sealing element interacting with one of the two valve seats is mounted on the end of each of the longer cross arms.

The frame is supported in a low-friction manner on one side by a closed seal, through which the webs extend and is fluidically separated from the cruciform carrier on the other side. The frame functions as an actuating section of the valve element and is located outside the valve chamber, while the carrier, which is part of the closing body, is located in the valve chamber and comes into contact with medium. When the frame swivels about the webs or the webs swivel in the seal, the cruciform carrier also simultaneously swivels.

The valve element is actuated via an electromagnet, which acts on the first end of the frame via the axially displaceable solenoid armature thereof. A valve closing spring and a pressure member are disposed between the solenoid armature and the first end of the frame and press the first end of the frame and, therefore, the sealing element disposed there in the direction of the first valve seat.

The second end of the frame and, therefore, the sealing element provided there are pressed via a compression spring and a pressure member in the direction of the associated second valve seat.

The closing force applied by the compression spring is less than the closing force applied by the valve closing spring and therefore, the first valve seat is closed when the electromagnet is de-energized.

When the electromagnet is energized, i.e., activated, the solenoid armature is displaced axially such that the first sealing element is lifted off of the first valve seat via the action of the compression spring.

The known device therefore creates a double-seat valve, which is controlled by a single valve element and has two separate valve inlets and a common valve outlet, wherein the valve inlets can be alternately connected to the valve outlet.

Document EP 1 536 169 B1 describes a further device for regulating a fluid or gaseous medium. The known device comprises a valve housing having a valve inlet and a valve outlet, and a valve opening, which is disposed between the valve inlet and the valve outlet and is surrounded by a valve seat. The valve opening and the valve seat are disposed in a valve chamber.

The valve seat interacts with a valve element to open and close the valve opening, said valve element being mounted on the first end face of an armature of an electromagnet extending into the valve chamber. The armature is guided so as to be axially displaceable in an armature sleeve, which is inserted into the valve chamber and is sealed therein against the chamber wall.

A fixed armature plug is disposed in the armature sleeve above the second end face of the armature, wherein an adjusting pin accessible from the outside is located in the armature plug and interacts with a valve closing spring disposed in a blind hole of the armature. The valve closing spring therefore bears against the armature on one side and against the adjusting pin on the other side. When the electromagnet is de-energized, the valve closing spring presses the armature and, thereby, the valve element onto the valve seat. The adjusting pin can be used to change the axial preload of the valve closing spring and, therefore, the closing force with which the valve element is seated on the valve seat.

The armature is supported in the armature sleeve on both of the end faces thereof by two flat springs such that the armature is contactlessly located in the armature sleeve with minimum radial play and can be axially displaced without touching the inner wall of the armature sleeve. The upper and lower flat springs have the same design but different diameters and have recesses, which extend in a spiral shape or have similarly resilient recesses.

When the adjusting pin is adjusted, the preload of the valve closing spring is changed and the preload of the upper flat spring also is changed. The preload of the lower flat spring can be changed by axially adjusting the armature sleeve.

When current is supplied to the electromagnet, the armature is displaced axially against the spring force of the valve closing spring and the armature lifts the valve element off of the valve seat, thereby opening the valve opening and, depending on the lift of the valve element, a relatively large or small volume of medium flows from the valve inlet via the valve chamber to the valve outlet.

The valve chamber is continually filled with medium. The medium flows constantly around the valve element and the end face of the armature, therefore.

Although the thusly described solenoid armatures have proven successful in everyday use, said solenoid armatures each have specific disadvantages in terms of their use in analytical and medical technology in particular.

The disadvantage of the device known from EP 1 536 169 B1 is that the axially displaceable, metallic armature extends into the valve chamber due to the design thereof, and therefore comes into contact with the medium, which is unacceptable in analytical and medical technology.

The disadvantage of the device known from EP 2 068 056 B1 is that said device does not permit stepless and/or hysteresis-free flow regulation.

SUMMARY OF THE INVENTION

The present invention overcomes the shortcomings of known arts, such as those mentioned above.

To that end, the present invention provides a solenoid armature that is supported via two flat springs and thereby suspended in a frictionless or at least low-friction manner, since no further guidance is required in order to hold the solenoid armature so as to be axially oriented.

The solenoid armatures supported between two flat springs also can be used to bring about the necessary actuation for the valve element comprising an actuating section and a closing body. In fact, the device according to the invention can be used for a continuous regulation of flow for analytical- and medical-technological applications, in which the medium must not come into contact with metallic parts such as the solenoid armature.

A hysteresis-free regulation of flow also is possible, because the valve element and the solenoid armature are both supported in a frictionless manner. The continuous opening and closing of the valve seat now makes it possible, even with a solenoid valve having a simple design, to obtain an exactly defined flow curve, which can be traversed in both directions without deviations.

The solenoid armature preferably comprises a central, axially extending guiding mandrel on one end face, wherein said guiding mandrel extends in a fixed magnet part with radial play and engages at a first of the two guide springs.

The medium flow is regulated very precisely within a large range, because the magnetic force is independent of the displacement of the solenoid armature. This makes it possible to obtain a well-definable and highly reproducible flow curve.

The solenoid armature further preferably comprises, on one end face, a peg that interacts with the actuating section and on which a second of the two flat springs engages. This measure has an advantageous design, because the solenoid armature can therefore be well actuated and adjusted in terms of displacement, because the solenoid armature is supported between the two flat springs.

It is furthermore advantageous that the peg and the guiding mandrel each perform two functions, because this makes the new device easy to assemble and install.

The solenoid armature is preferably disposed so as to be axially displaceable in a guide sleeve of the electromagnet, on which the magnet part is mounted, and a central axial bore is provided in the magnet part, in which an adjusting spring and an adjusting screw are disposed such that the adjusting screw presses the adjusting spring against the guiding mandrel. This measure makes it possible, using a simple design, to adjust the closing force when the electromagnet is de-energized and to adjust the starting point of the flow curve.

It is preferable that when the magnet part comprises a magnetic plug and a magnet pole piece fixedly connected thereto, a passage opening is provided in the magnet pole piece, in which the guiding mandrel extends, and the bore for the adjusting spring is disposed in the magnet pole piece, the first flat spring is preferably disposed between the magnetic plug and the magnet pole piece, the first flat spring is further preferably clamped between the magnetic plug and the magnet pole piece, and, finally, the magnetic plug and the magnet pole piece are screwed together.

These measures are structurally advantageous, individually and in entirety, because the guide sleeve can be produced as one unit from the individual components and can be subsequently installed on the new device.

Further preferably, an annular flange is provided at one end of the guide sleeve, via which the guide sleeve is attached to the valve housing and the lower flat spring is preferably clamped between the annular flange and the valve housing. This measure also is structurally advantageous, because the flat spring is fixed in position simply as a result of assembly.

A receiving chamber is preferably provided in the valve housing, into which the peg and a thrust element for the actuating section of the valve element extend, wherein the annular flange surrounds the receiving chamber. This measure makes simple assembly possible.

A guide chute is further preferably provided in the valve housing, in which a thrust element for the actuating section of the valve element and a return spring are disposed, said return spring acting on the actuating section via the thrust element. This measure ensures, in a structurally simple manner, that the valve element is moved without play, thereby preventing switching hystereses.

In this case, it is preferable for the return spring to act on the actuating section from the same side as the peg. This measure creates the possibility for a second valve seat, which can be actuated via the valve element, and therefore creates the possibility for a third valve connection.

In one embodiment, a third valve connection is provided on the valve housing and a second valve seat is provided in the valve housing, wherein the second valve seat is fluidically connected to the valve chamber and the third valve connection and is actuated via the valve element. This measure creates a valve that results in the variants 2/2 NO (normally open) and 2/2 NC (normally closed) for two valve connections and two switching positions, as well as 3/2 U for three valve connections and two switching positions having a changeover function.

It also is preferable for the actuating section to be connected to the closing body via two webs, which extend through a seal separating the actuating section and the closing body from one another. This measure ensures that the valve element is supported in a low-friction manner and therefore contributes to the hysteresis-free flow curve.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
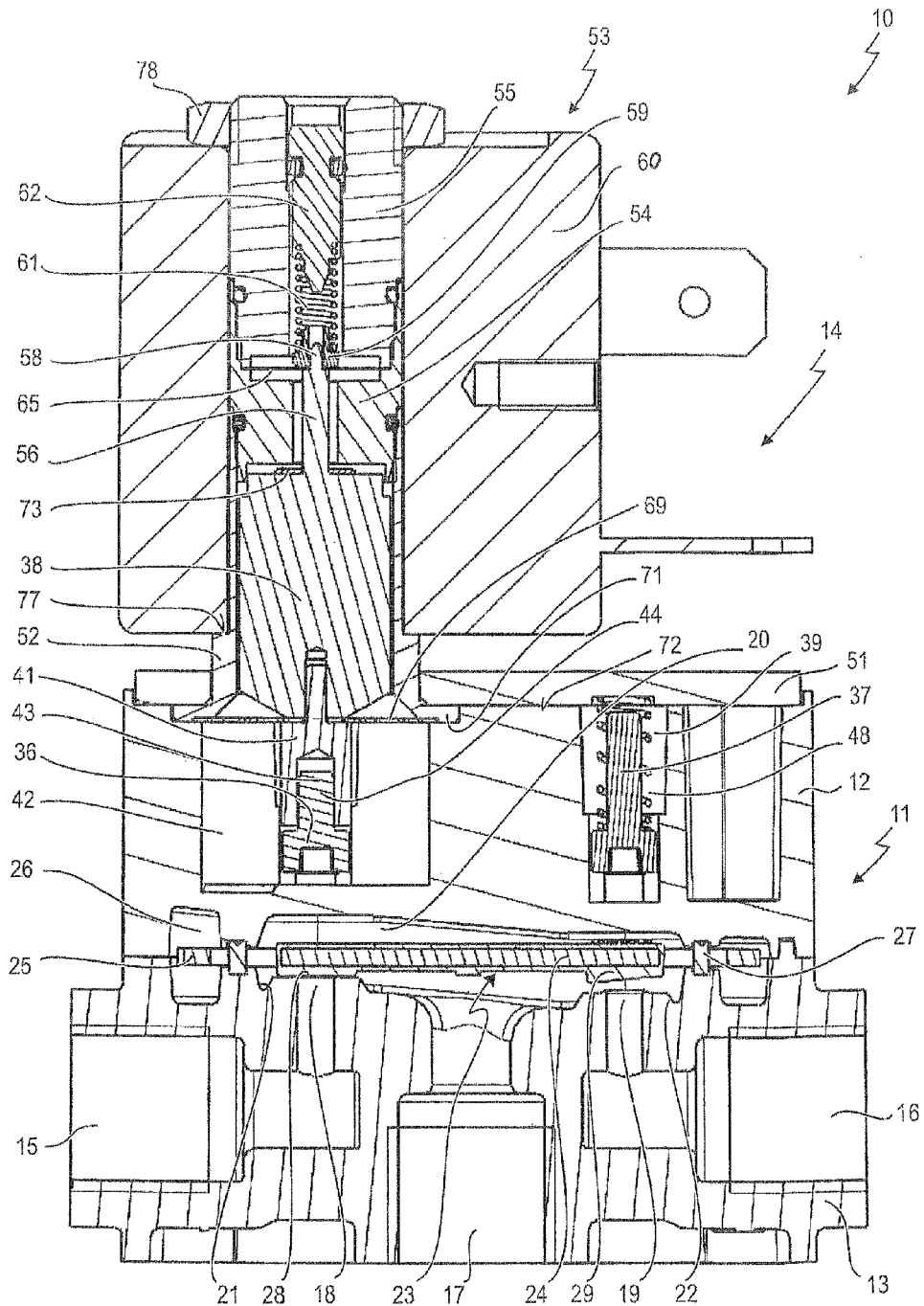
FIG. 1 shows a longitudinal sectional side view of a device for regulating the flow of a fluid.
Figure 2:
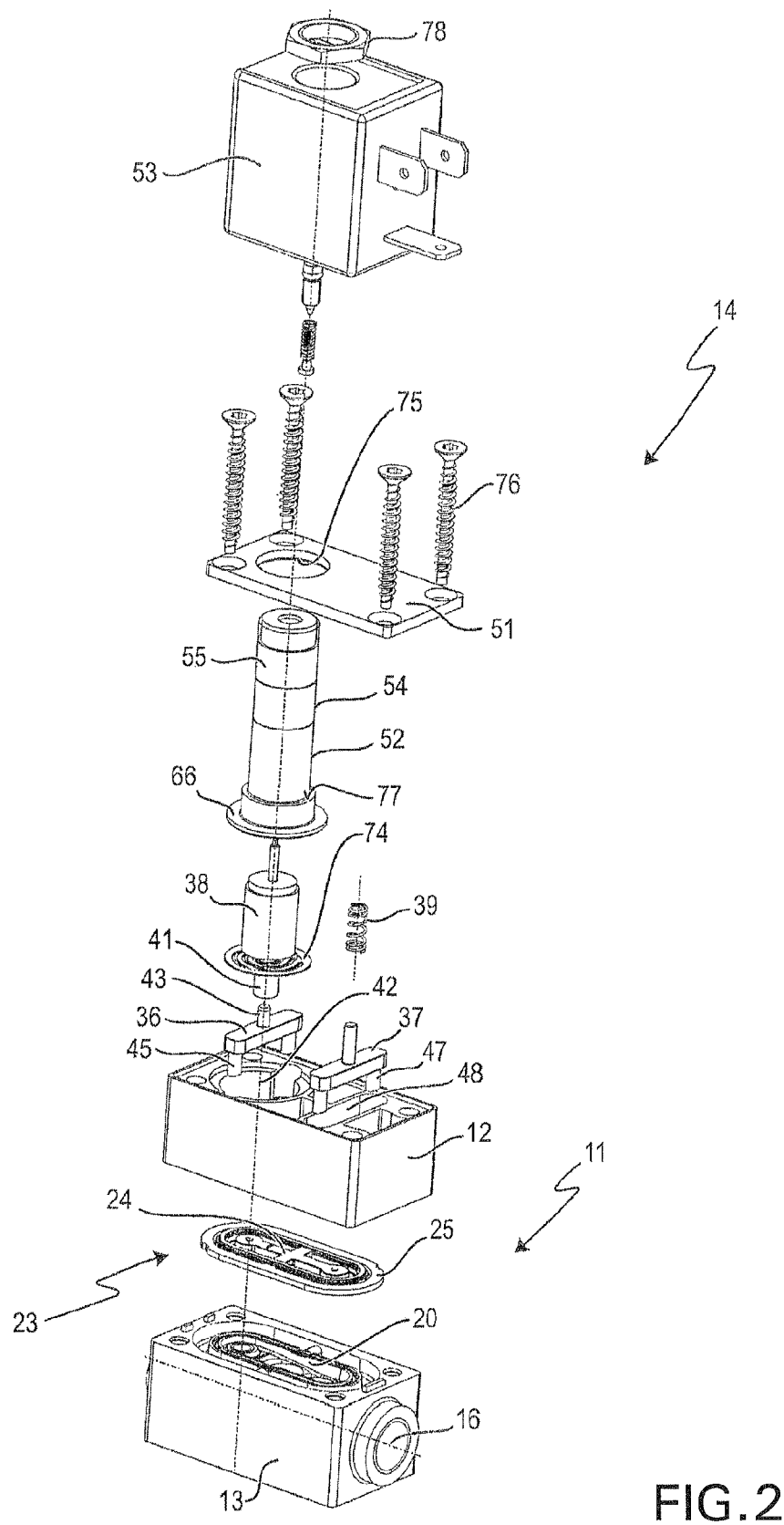
FIG. 2 shows a schematic exploded illustration of the device from FIG. 1.

FIGS. 1 and 2 show a device 10 for regulating the flow of a fluid or a flowing medium, e.g., a fluid or a gaseous medium. Device 10 comprises a two-component valve housing 11 formed of an upper housing part 12 and a lower housing part 13. The medium flows through the lower housing part 13, while an actuating device 14 for regulating the flow of the medium is provided on the upper housing part 12, said actuating device being separated from the medium.

In the lower housing part 13 of the valve housing 11, two valve outlets 15, 16, as valve connections, are provided on sides facing away from each other, and a valve inlet 17 is disposed therebetween. A first valve opening 18 is disposed between the valve outlet 15 and the valve inlet 17, and a second valve opening 19 is disposed between the valve outlet 16 and the valve inlet 17. The axes of the two valve openings 18, 19 are oriented parallel to one another.

The two valve openings 18, 19 lead into a valve chamber 20, which is formed at the interface between the upper housing part 12 and the lower housing part 13, wherein an upper part of the valve chamber 20 is formed in the upper housing part 12 and a lower part of the valve chamber 20 is formed in the lower housing part 13. The first valve opening 18 is concentrically surrounded by a first valve seat 21 and the second valve opening 19 is concentrically surrounded by a second valve seat 22.

The two valve openings 18, 19 are controlled by a single valve element 23, which can completely close only one of the two valve openings 18, 19 at a time, but which can partially open or close both valve openings. In this manner, medium can be selectively directed from the valve inlet 17 to only one of the two valve outlets 15, 16, continuously switched from one of the valve outlets 15, 16 to the other, or distributed in any manner between the two valve outlets 15, 16.

To this end, the valve element 23 is actuated by the actuating device 14, wherein, if the actuating device 14 is inactive, the valve element 23 closes the first valve opening 18 and opens the second valve opening 19, as shown in FIG. 1.

The valve element 23 comprises a closing body 24 disposed in the valve chamber 20. The closing body interacts with the valve seats 21, 22. The valve element 23 further comprises a frame 25 as the actuating section, which is disposed outside the valve chamber 20 and is therefore separated from the medium, and surrounds the closing body 24 at a distance therefrom. The closing body 24 is fixedly disposed on the frame. The frame 25 is swivelably disposed in a cavity 26 surrounding the valve chamber 20.

The cavity 26 also is located in the interface between the two housing parts 12, 13, wherein an upper part of the peripheral cavity 26 is formed in the upper housing part 12 and a lower part of the cavity 26 is formed in the lower housing part 13. The valve chamber 20 and the cavity 26 are hermetically separated from one another by a closed peripheral seal 27 secured between the two housing parts 12, 13.

Two sealing elements 28, 29 are disposed on the closing body 24, are assigned to the valve seats 21 and 22, respectively, close said valve seats completely when lying thereon in entirety, and partially or completely open said valve seats, depending on how far away said sealing elements are lifted off thereof.

Figure 3:
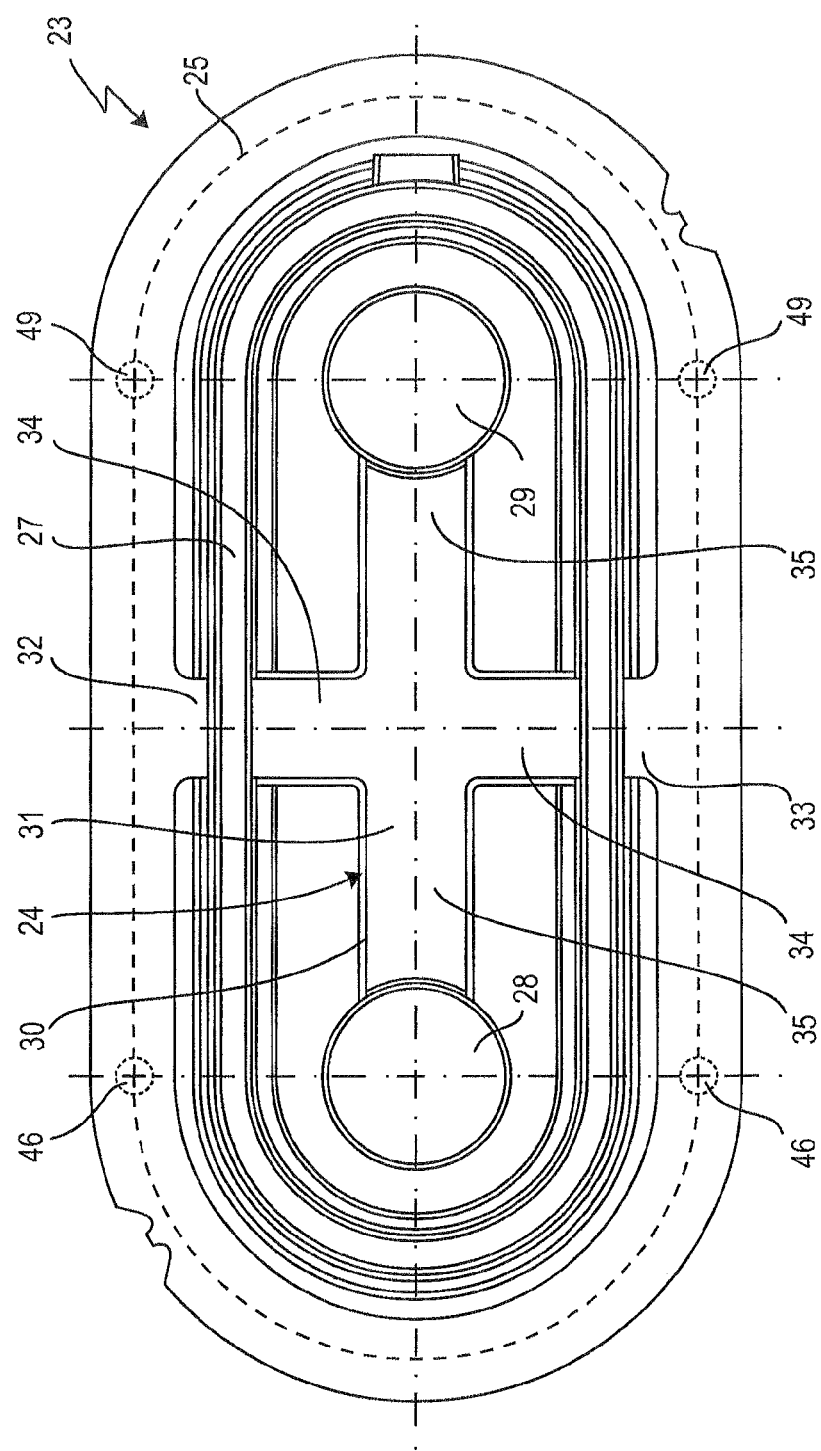
FIG. 3 shows an underside view of the valve element from FIG. 2.

FIG. 3 shows the valve element 23 in a view from below, i.e., looking onto the two sealing elements 28, 29.

The closing body 24 comprises a flat, cruciform carrier 30 and a covering 31, e.g., of plastic, rubber, an elastomer, or the like, which encases the carrier 30. The frame 25 is rigidly connected to the shorter cross arms 34 of the carrier 30 via two webs 32, 33, for example, which are disposed diametrically opposite one another on the frame 25 in the center. The webs 32, 33 extend through the seal 27 transversely to the longitudinal extension thereof and, after the seal 27 is clamped between the two housing parts 12, 13, the webs form a frictionless swivel support for the valve element 23.

The sealing surfaces 28, 29 interacting with the valve seats 21, 22 are formed at the ends of the two longer cross arms 35.

The valve seats 21, 22, which are disposed on sides of the swivel support of the valve element 23 facing away from each other, at the same distance away from the swivel support and offset relative to one another, are planar and have different perpendicular distances from the swivel support. The perpendicular distance of the second valve seat 22 is greater than that of the first valve seat 21. The perpendicular distance is understood to be the distance of the plane, in which the planar valve seat 21 or 22 is located, from the swivel support.

As is evident from FIG. 1, the sealing surface 28 interacting with the first valve seat 21 is oriented parallel to the plane of the frame 25 and the carrier 30, while the sealing surface 29, which interacts with the second valve seat 22, which is set back relative to the first valve seat 21, is oriented so as to form an acute angle with the plane of the frame 25 and the carrier 31. The inclination angle of the sealing surface 29 corresponds to the swivel angle about which the valve element 23 is swivelled in order to completely close the second valve opening 19 and thereby completely open the first valve opening 18.

The frame 25, the carrier 30, and the two interconnected webs 32, 33 are produced from a metal sheet as a single piece as a punched cut. The covering 31 is advantageously produced by extrusion-coating the carrier 30 with, e.g., plastic, rubber, an elastomer, or the like. When the carrier 30 is extrusion-coated, the closed, peripheral seal 27 is simultaneously produced from the same material, the seal covering the webs 32, 31 on both sides, wherein the webs extend from the frame 25 to the carrier 30 and are formed as a single piece with the frame 25 and the carrier 30.

The frame 25, and therewith, the closing body 24, is swivelled via the interaction of two pressure forks 36, 37, as is evident from FIGS. 1 and 2. The first pressure fork 36 is pressed onto the frame 25 via a solenoid armature 38 and the second pressure fork 37 is pressed onto the frame 25 via a return spring 39, in order to swivel the frame in the opposite direction about the swivel support formed by the webs 32 and 33 in interaction with the seal 27.

The solenoid armature 38 comprises, on the lower end face thereof, a peg 41 having a reduced diameter, which plunges into a receiving chamber 42 formed in the upper housing part 12. The first pressure fork 36 is located, via the upper shank 43 thereof, in an axial blind hole 44 in the peg 41 and rests via the fork tines 45 thereof on the frame 25 at the point indicated in FIG. 3 with circles 46 formed by dotted lines.

The second pressure fork 37, with the fork tines 47 thereof, is axially displaceably guided in a guide chute 48 formed in the upper housing part 12 of the valve housing 11. The fork tines 47 of the second pressure fork 37 also rest on the frame 25 and, in fact, at two points 49 disposed opposite one another at the second valve opening 19, and are pressed onto the frame 25 by the return spring 39. The return spring is slid onto the shank of the pressure fork 37 and bears against the pressure fork 37 on one side and against the housing on the other side.

The two pressure forks 36, 37 therefore act on the frame 25 of the valve element 23 on the same side.

The spring force of the return spring 39 is less than the force with which the solenoid armature 38 presses onto the first pressure fork 36 when the actuating device 14 is inactive, and therefore the second pressure fork 37 is capable of pressing the valve element 23 with the sealing surface 29 onto the second valve seat 22 only when the closing force acting on the valve closing element 23 at the point of the first valve opening 18 has been alleviated by the axial displacement of the solenoid armature 38.

A cover plate 51, which has been placed on the top side of the upper housing part 12 and screwed together with the valve housing 11, closes the receiving chamber 42, thereby defining a guide sleeve 52 which guides the solenoid armature 38, and closes the guide chute 47 of the second pressure fork 37, wherein the return spring 39 seated on the pressure fork 37 bears against the inside of the cover plate 51.

If the actuating device is inactive, the valve element 23 assumes the position shown in FIG. 1, in which the sealing surface 28 is pressed onto the first valve seat 21 of the first valve opening 18, and the sealing surface 29 of the second valve seat 22 is lifted off of the second valve opening 19. In this case, a flow path from the valve inlet 17 to the valve outlet 16 is opened and the flow path from the valve inlet 17 to the valve outlet 15 is blocked.

When the actuating device 14 is activated, the solenoid armature 38 moves upwardly. The spring force of the return spring 39 causes the pressure fork 37 to swivel the valve element 23 about the swivel support at the webs 32, 33 and presses the valve element 23, with the sealing surface 29, onto the second valve seat 22 at the second valve opening 19. The flow path from the valve inlet 17 to the valve outlet 16 is blocked and the flow path from the valve inlet 17 to the valve outlet 15 is opened.

The actuating device 14 comprises an electromagnet 53, which has a proportional behavior and therefore develops magnetic forces that are proportional to the excitation current in which the guide sleeve 52 is disposed. The solenoid armature 38 is supported in the guide sleeve 52 so as to be axially displaceable. A magnet pole piece 54 is disposed axially opposite the solenoid armature 38 and a magnetic plug 55 is disposed axially opposite the magnet pole piece; the magnetic plug is screwed together with the magnet pole piece 54. The magnet pole piece 54 is disposed, in an axially non-displaceable manner, with a section of the longitudinal extension thereof within the guide sleeve 52.

The guide sleeve 52, the magnetic plug 55, and the magnet pole piece 54 are surrounded by an excitation winding or coil 60.

The ends of the solenoid armature 38 and the magnet pole piece 54 facing one another mesh with one another, and so the magnetic force acting between the solenoid armature 38 and the magnet pole piece 54 is independent of the displacement of the solenoid armature 38.

Figure 4:
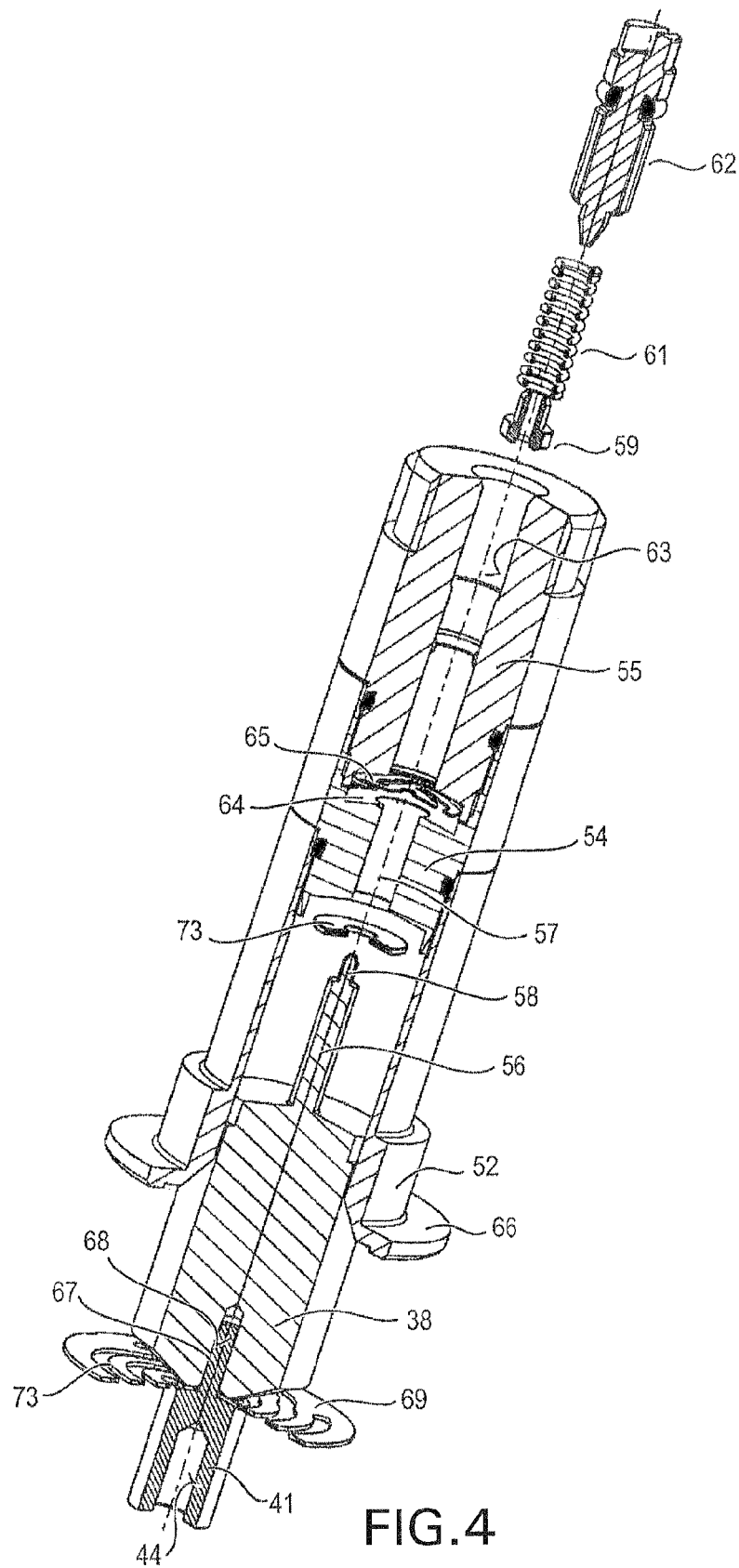
FIG. 4 shows a schematic exploded illustration of the armature used in the device from FIGS. 1 and 2, including and armature plug and an armature sleeve.

The exploded illustration in FIG. 4 clearly shows that an axially extending guiding mandrel 56 is formed in the center on the solenoid armature 38. The guiding mandrel extends through an axial passage opening 57 in the magnet pole piece 54 with radial play. A tip 58 is formed on the end face of the guiding mandrel 56, on which said tip a thrust element 59 is located, on which an adjusting spring 61 is located.

The adjusting spring 61 is disposed underneath an adjusting screw 62 in a central axial bore 63 in the magnetic plug 55. The adjusting screw 62 presses the adjusting spring 61 against the guiding mandrel 56.

A circular cavity 64 is formed between the magnet pole piece 54 and the magnetic plug 55, in which said cavity an upper flat spring 65 is disposed, into which the flat spring the guiding mandrel 56 of the solenoid armature 38 engages. The upper flat spring 65 is clamped between the magnet pole piece 54 and the magnetic plug 55.

The guide sleeve 52 comprises an annular flange 66 on the lower end thereof, by which this guide sleeve rests on the upper housing part 12 and surrounds the receiving chamber 42. By the annular flange 66, the cover plate 51 presses the guide sleeve 52 onto the upper housing part 12, thereby holding the fastening device 14 against the valve housing 11.

The peg 41 on the solenoid armature 38 is designed as a separate component, which is located with a shank 67 in an end-face blind hole 68 in the solenoid armature 38.

A lower flat spring 69 is disposed between the solenoid armature 38 and the peg 41, the flat spring having a larger outer diameter than the solenoid armature 38 and being located in a circular receiving space 71 in the top side 72 of the upper housing part 12, which surrounds the receiving chamber 42.

The annular flange 66 is also located in this receiving space 72, and therefore the lower flat spring 69 is clamped between the upper housing part 12 and the guide sleeve 52.

In this manner, the solenoid armature 38 is supported against the upper flat spring 65 via the guiding mandrel 56 and against the lower flat spring 69 via the peg 41 such that the solenoid armature is contactlessly located in the guide sleeve 52 with minimum radial play and can be axially displaced without touching the inner wall of the guide sleeve 52.

When the solenoid coil 60 is de-energized, the adjusting spring 61 presses the solenoid armature 38 onto the pressure fork 36, thereby ensuring that the sealing element 28 closes the first valve seat 21. The closing force exerted thereby can be changed by rotating the adjusting screw 62, which further compresses or decompresses the adjusting spring 61.

The upper and lower flat springs 65, 69 have the same design but different diameters. Each of the flat springs 65, 69 is made of spring steel, for example, having a material thickness of 0.05-0.3 mm and is provided with a central opening, by which the flat spring is located on the guiding mandrel 56 or the shank 67, respectively. In addition, recesses 74 extending in a spiral shape are formed in the flat springs 65 and 69 with different radial separation. The upper flat spring 65 has a smaller diameter than the lower flat spring 69.

A plain washer 73 is disposed between the solenoid armature 38 and the magnet pole piece 54. The plain washer is located on the guiding mandrel 56 and is used to dampen the stop when the solenoid armature 38 is drawn axially upward as well as to reduce the effects of the residual magnetization.

The device 10 is designed with only four spring elements, namely the two flat springs 65 and 69, the adjusting spring 61 and the return spring 39, such that flow control can be implemented in a frictionless and hysteresis-free manner. The pre-load force on the valve seat 21 can be adjusted and the contact between the solenoid armature 38 and the valve element 23 can be kept free of play. It is thereby possible to define the starting point of the flow curve in a reliable and reproducible manner.

When the new device 10 is assembled, the valve element 23 is first placed into the lower housing part 13 and then the upper housing part 12 is placed thereon. The pressure fork 36 is then placed into the receiving chamber 42 and the pressure fork 37, with the return spring 39, is inserted into the guide chute 48.

Next, the unit comprising the guide sleeve 52, the magnetic plug 55, the upper flat spring 65, the magnet pole piece 54, the solenoid armature 38, and the lower flat spring 69 with the annular flange 66, are inserted into the receiving space 71.

Finally, the cover plate 51 is placed onto the upper housing part 12, wherein the guide sleeve 52 extends through an opening 75 in the cover plate 51. The housing parts 12, 13 and the cover plate 51 are then screwed together by screws 76, thereby fixedly clamping the guide sleeve 52 and the lower flat spring 69 on the upper housing part 12.

The solenoid coil 60 his then slid onto the guide sleeve 52 and is fixed so as to be axially non-displaceable between a shoulder 77 encircling the guide sleeve 52 on the outside and a nut 78 screwed on the magnetic plug 55.

Instead of the three valve connections 15, 16 and 17, the new device 10 also can be equipped with only two valve connections 15 and 17. In that case, the second valve seat 23 and the second sealing element 29 are not needed. A thusly modified device 10 can be used to regulate the flow of medium between the valve connections 15 and 17 in a continuous and hysteresis-free manner.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A device for regulating the flow of a fluid, comprising:
   a valve housing having at least two valve connections that are fluidically connected to one another via a valve chamber;
   at least one valve seat having a fluid connection to the valve chamber and one of the at least two valve connections;
   a valve element with an actuating section located outside of the valve chamber and a closing body located within the valve chamber for the at least one valve seat; and
   an electromagnet having a solenoid armature that acts upon the actuating section;
   wherein the solenoid armature is supported via two flat springs;
   wherein the solenoid armature comprises a central, axially extending guiding mandrel on one end face, which extends in a fixed magnet part with radial play and engages at a first of the two flat springs;
   wherein the solenoid armature is disposed to be axially displaceable in a guide sleeve of the electromagnet, on which the fixed magnet part is mounted;
   wherein a central axial bore is provided in the fixed magnet part; and
   wherein an adjusting spring and an adjusting screw are disposed in the central axial bore such that the screw presses the adjusting spring against the guiding mandrel.

2. The device according to claim 1, wherein the solenoid armature comprises, on one end face, a peg that interacts with the actuating section and on which a second of the two flat springs engages.

3. The device according to claim 1, wherein the fixed magnet part comprises a magnetic plug and a magnet pole piece fixedly connected thereto, a passage opening is provided in the magnet pole piece, in which the guiding mandrel extends, and the bore is disposed in the magnet pole piece.

4. The device according to claim 3, wherein the first flat spring is disposed between the magnetic plug and the magnet pole piece.

5. The device according to claim 3, wherein the first flat spring is clamped between the magnetic plug and the magnet pole piece.

6. The device according to claim 1, wherein the magnetic plug and the magnet pole piece are screwed together.

7. The device according to claim 2, wherein an annular flange is provided at one end of the guide sleeve, via which the guide sleeve is attached to the valve housing.

8. The device according to claim 7, wherein the lower flat spring is clamped between the annular flange and the valve housing.

9. The device according to claim 7, wherein a receiving chamber is provided in the valve housing, into which the peg and a first pressure fork for the actuating section of the valve element extend, and wherein the annular flange surrounds the receiving chamber.

10. The device according to claim 9, wherein a guide chute is provided in the valve housing, in which a second pressure fork for the actuating section of the valve element and a return spring are disposed, the return spring acting on the actuating section via the second pressure fork.

11. The device according to claim 10, wherein the return spring acts on the actuating section from the same side as the peg.

12. The device according to claim 1, wherein a third valve connection is provided on the valve housing and a second valve seat is provided in the valve housing, and wherein the second valve seat is fluidically connected to the valve chamber and the third valve connection and is actuated via the valve element.

13. The device according to claim 1, wherein the actuating section is connected to the closing body via two webs, which extend through a seal, wherein the seal separates the actuating section and the closing body from one another.

* * * * *